United States Patent
Kundu et al.

(10) Patent No.: US 10,747,615 B2
(45) Date of Patent: Aug. 18, 2020

(54) METHOD AND APPARATUS FOR NON-VOLATILE MEMORY ARRAY IMPROVEMENT USING A COMMAND AGGREGATION CIRCUIT

(71) Applicant: DELL PRODUCTS, LP, Round Rock, TX (US)

(72) Inventors: Anirban Kundu, Bangalore (IN); Vemuri Sai Krishna, Bengaluru (IN); Abhijit Mirajkar, Bangalore (IN); Ragendra K. Mishra, Bangalore (IN); Krishna Kumar P. K., Bangalore (IN); Srikrishna Ramaswamy, Austin, TX (US); Shyamkumar T. Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 104 days.

(21) Appl. No.: 16/013,466

(22) Filed: Jun. 20, 2018

(65) Prior Publication Data

US 2019/0391876 A1    Dec. 26, 2019

(51) Int. Cl.
*G06F 11/10*      (2006.01)
*G06F 3/06*       (2006.01)

(52) U.S. Cl.
CPC ........ *G06F 11/1088* (2013.01); *G06F 3/0688* (2013.01)

(58) Field of Classification Search
None
See application file for complete search history.

(56) References Cited

U.S. PATENT DOCUMENTS

| 8,966,164 | B1  | 2/2015 | Asnaashari et al. |
| 9,384,093 | B1  | 7/2016 | Aiello |
| 2016/0026388 | A1* | 1/2016 | Jeong .............. G06F 3/061 |
| | | | 711/103 |
| 2016/0124874 | A1 | 5/2016 | Hassan |
| 2017/0123656 | A1 | 5/2017 | Benisty et al. |

FOREIGN PATENT DOCUMENTS

CN       104601729 A       5/2015

* cited by examiner

*Primary Examiner* — Michael Alsip
(74) *Attorney, Agent, or Firm* — Larson Newman, LLP

(57) ABSTRACT

A queue-based non-volatile memory (NVM) hardware assist card, information handling system, and method are disclosed herein. An embodiment of the queue-based NVM hardware assist card includes a plurality of downstream ports configured to be connected to a corresponding plurality of actual queue-based NVM storage devices, a plurality of upstream ports configured to appear as a plurality of apparent queue-based NVM storage devices, and a distinct upstream port of a different type than the plurality of upstream ports, the distinct upstream port for interacting with a host processor to receive a consolidated processing NVM command from and to return a consolidated processing NVM command completion indication, the queue-based NVM hardware assist card configured to aggregate multiple of the NVM command completion messages received via respective ones of the plurality of downstream ports from respective ones of the plurality of actual queue-based NVM storage devices and to generate the consolidated processing NVM command completion indication.

20 Claims, 5 Drawing Sheets

| | 301 | 302 |
|---|---|---|
| 300 → | NVMe DRIVE CMD INDEX SLOT (1 BYTE) | NVMe DRIVE SERIAL NUMBER (20 BYTES) |
| 307 / 303 → | NVMe DRIVE INDEX 0 | RP1_NVMe_A_SERIAL_NUMBER — 308 |
| 309 / 304 → | NVMe DRIVE INDEX 1 | RP1_NVMe_B_SERIAL_NUMBER — 310 |
| 311 / 305 → | NVMe DRIVE INDEX 2 | RP1_NVMe_C_SERIAL_NUMBER — 312 |
| 313 / 306 → | NVMe DRIVE INDEX 3 | RP1_NVMe_D_SERIAL_NUMBER — 314 |

*FIG. 3*

| | 401 | 402 |
|---|---|---|
| 400 → | | |
| 407 / 403 → | NVMe DRIVE INDEX 0 | NVMe COMMAND — 408 |
| 409 / 404 → | NVMe DRIVE INDEX 1 | NVMe COMMAND — 410 |
| 411 / 405 → | NVMe DRIVE INDEX 2 | NVMe COMMAND — 412 |
| 412 / 406 → | NVMe DRIVE INDEX 3 | NVMe COMMAND — 414 |

*FIG. 4*

| | 501 | 502 |
|---|---|---|
| 500 → | | |
| 507 / 503 → | NVMe DRIVE INDEX 0 | NVMe RESPONSE — 508 |
| 509 / 504 → | NVMe DRIVE INDEX 1 | NVMe RESPONSE — 510 |
| 511 / 505 → | NVMe DRIVE INDEX 2 | NVMe RESPONSE — 512 |
| 512 / 506 → | NVMe DRIVE INDEX 3 | NVMe RESPONSE — 514 |

*FIG. 5*

METHOD AND APPARATUS FOR NON-VOLATILE MEMORY ARRAY IMPROVEMENT USING A COMMAND AGGREGATION CIRCUIT

FIELD OF THE DISCLOSURE

This disclosure generally relates to information handling systems, and more particularly relates to information handling systems having an array of non-volatile memory (NVM) storage devices.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A queue-based non-volatile memory (NVM) hardware assist card, information handling system, and method are disclosed herein. An embodiment of the queue-based NVM hardware assist card includes a plurality of downstream ports configured to be connected to a corresponding plurality of actual queue-based NVM storage devices, a plurality of upstream ports configured to appear as a plurality of apparent queue-based NVM storage devices, and a distinct upstream port of a different type than the upstream ports, the distinct upstream port for interacting with a host processor to receive a consolidated processing NVM command from and to return a consolidated processing NVM command completion indication to the host processor, the queue-based NVM hardware assist card configured to aggregate multiple of the NVM command completion messages received via respective ones of downstream ports from respective ones of actual queue-based NVM storage devices and to generate the consolidated processing NVM command completion indication to provide to the host processor.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 3 is a tabular diagram illustrating an NVMe command slot reservation payload as may be used within the information handling system according to an embodiment of the present disclosure;

FIG. 4 is a tabular diagram illustrating an NVMe submission queue entry as may be used within the information handling system according to an embodiment of the present disclosure;

FIG. 5 is a tabular diagram illustrating an NVMe completion queue entry as may be used within the information handling system according to an embodiment of the present disclosure;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
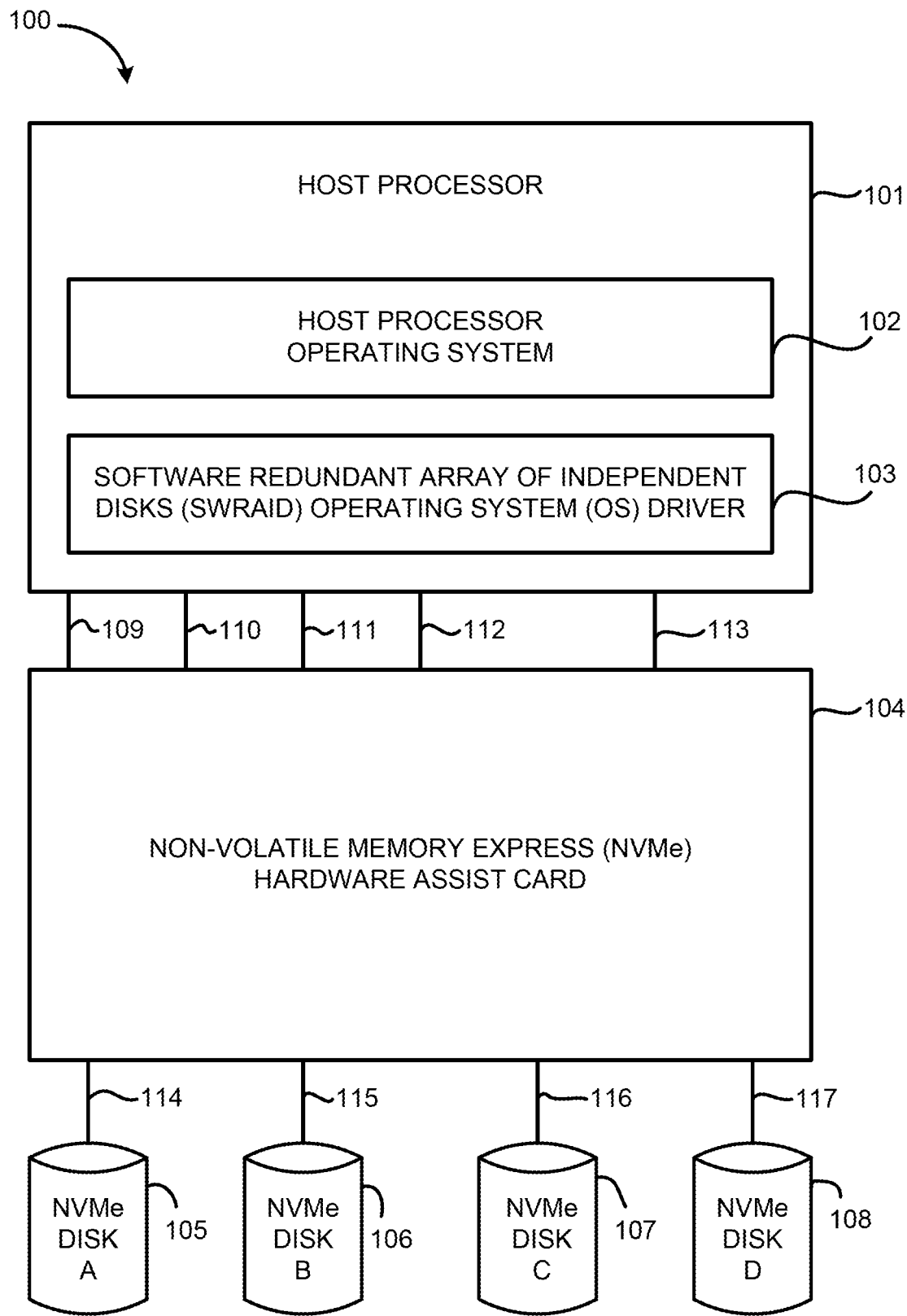
FIG. 1 is a block diagram of an information handling system according to an embodiment of the present disclosure.

FIG. 1 is a block diagram of an information handling system according to an embodiment of the present disclosure. Information handling system 100 includes host processor 101, non-volatile memory express (NVMe) hardware assist card 104, NVMe disk A 105, NVMe disk B 106, NVMe disk C 107, and NVMe disk D 108. Host processor 101 includes host processor operating system 102 and software redundant array of independent disks (SWRAID) operating system (OS) driver 103. Host processor 101 is connected to NVMe hardware assist card 104 via endpoint interconnection A 109, endpoint interconnection B 110, endpoint interconnection C 111, endpoint interconnection D 112, and consolidated processing interconnection 113, which may, for example, be a Peripheral Component Interconnect Express (PCIe) consolidated processing interconnection. NVMe hardware assist card 104 is connected to NVMe disk A 105 via downstream interconnect 114. NVMe hardware assist card 104 is connected to NVMe disk B 106 via downstream interconnect 115. NVMe hardware assist card 104 is connected to NVMe disk C 107 via downstream interconnect 116. NVMe hardware assist card 104 is connected to NVMe disk D 108 via downstream interconnect 117. NVMe hardware assist card 104 and NVMe disk A 105, NVMe disk B 106, NVMe disk C 107, and NVMe disk D 108 are examples of a queue-based NVM hardware assist card and queue-based NVM storage devices, respectively. As one example, unlike a load-and-store-based NVM device, which operates synchronously, a queue-based NVM device can operate asynchronously. For example, NVMe disk A 105, NVMe disk B 106, NVMe disk C 107, and NVMe disk D 108 need not operate synchronously with a host processor clock signal of host processor 101 or with an NVMe hardware assist card clock signal of NVMe hardware assist card 104, and NVMe hardware assist card 104 need not operate synchronously with a host processor clock signal of host processor 101 or with an NVMe disk clock signal of any of NVMe disk A 105, NVMe disk B 106, NVMe disk C 107, or NVMe disk D 108.

Traditional information handling system architectures have impeded performance. For example, relying on a host processor to interact directly with an array of storage devices directly connected to the host processor burdens the host processor with many processing operations and impairs the performance of the host processor. Problems that can be associated with such reliance on a host processor interacting directly with an array of storage devices can include high host processor utilization, which can result from interrupt context switch overhead; performance degradation; and reduced host processor efficiency.

The primary contributor for high host processor usage is interrupt generation and the associated interrupt context-switching overhead caused by multiple input-output operations (IOs) submitted to different NVM (such as non-volatile memory express (NVMe)) drives for a single IO request sent from the host processor to a redundant array of independent disks (RAID) virtual disk (VD). Also unlike traditional RAID drivers, which can disable interrupts coming from the host bus adapter (HBA)/controller when the driver is already processing an interrupt, with NVMe drives which use an extended message signaled interrupt (MSI-X) such an option of disabling an interrupt is not available to NVMe RAID driver. Hence, generation of such a large number of interrupts results in much pre-emption of threads running on different cores, which wastes host processor bandwidth and increases the overhead due to interrupt context switching.

As stated above, another possible problem is performance degradation. When IO stress is run on a maximum number of NVMe RAID VDs (created from a maximum number of NVMe drives) supported by a software RAID (SWRAID) driver, host processor utilization can reach 100% consistently and the input-output operations per second (IOPS) and throughput readings (per VD) decrease. Hence, the scaling of TOPS is not necessarily uniform when the number of NVMe VDs increase. This can happen primarily due to a large volume of interrupts which can be generated from the NVMe drives, which causes pre-emption of threads running on the logical processors, thereby adding to interrupt context switching overheads. In the case of VDs, like Degraded RAID5, which internally carries out large number of IOs to complete a single IO request (READ/WRITE) from a host processor, running with a below-optimal queue depth configuration for the host processor driver may be done since otherwise the maximum configuration support cannot be provided and system responsiveness slows down.

As stated above, another possible problem is reduced host processor efficiency. Host processor efficiency can be reduced, for example, by large numbers of interrupts which get generated, along with context switching overheads.

As an example, for RAID1 4K write requests, an SWRAID driver has to issue 4K write IO requests on two NVMe drives, which results in the generation of two interrupts (resulting in additional context switching overheads). This can result in host processor efficiency of around 55% for SWRAID as compared to theoretical estimates.

As another example, for RAID5 4K Write Requests, an SWRAID driver has to issue two 4K read and two 4K write IO requests along with performing parity calculations, which results in the generation of four interrupts (resulting in additional context switching overheads). This results in host processor efficiency of around 17% for SWRAID as compared to theoretical estimates.

IOPS and host processor utilization can illustrate reduced host processor efficiency. For example, for writes, additional IO operations can cause a host processor to lag behind and be only about half efficient when compared to theoretical estimates.

The examples presented above illustrate how additional interrupts generated from NVMe drives reduce the host processor efficiency, scalability, and performance of the SWRAID stack with NVMe drives. Accordingly, a technological improvement in the art is needed to avoid such disadvantages and to usefully improve performance.

Figure 2:
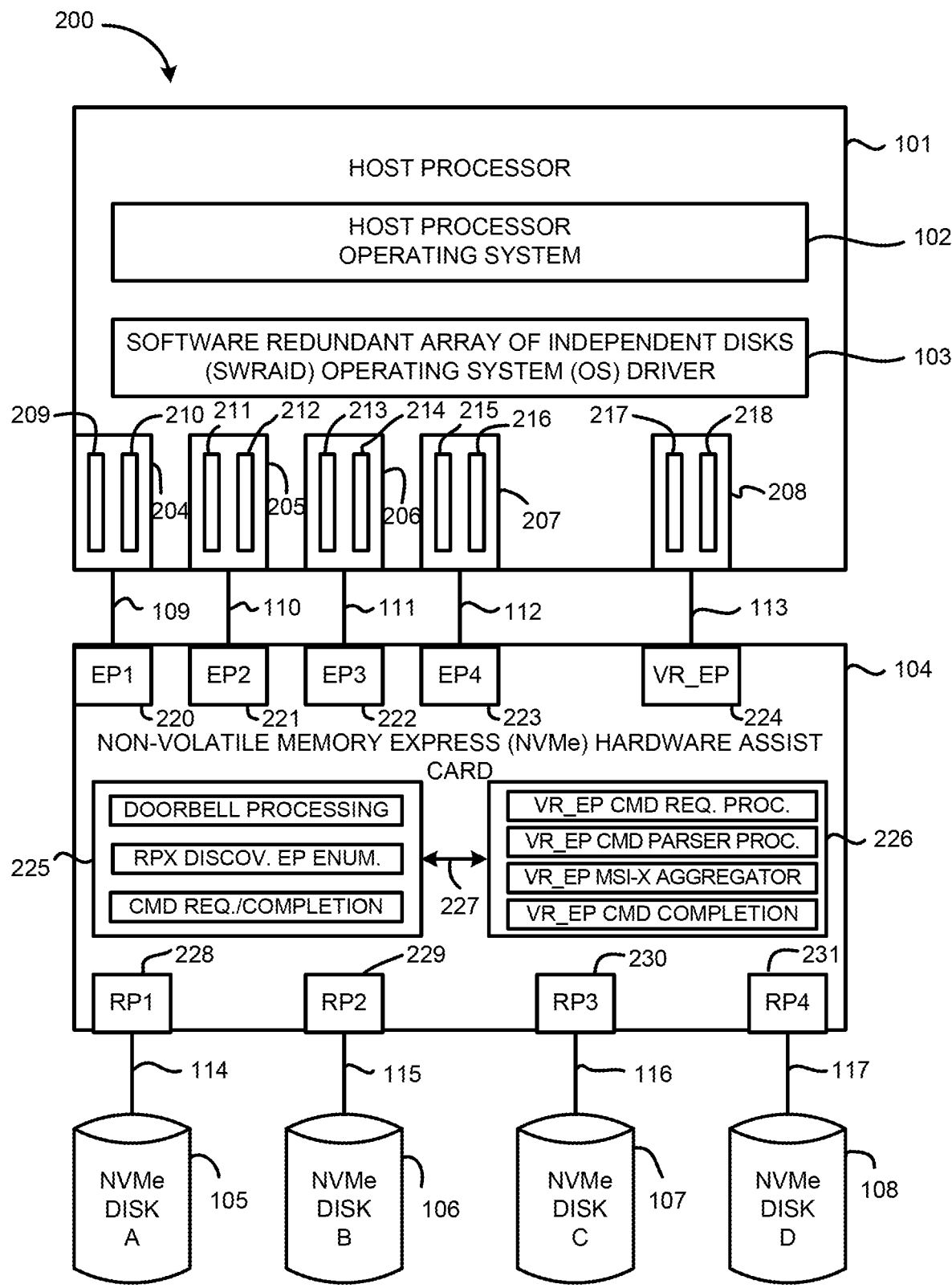
FIG. 2 is a block diagram illustrating, in greater detail, an information handling system according to an embodiment of the present disclosure.

FIG. 2 is a block diagram illustrating, in greater detail, an information handling system according to an embodiment of the present disclosure. Information handling system 200 includes host processor 101, non-volatile memory express (NVMe) hardware assist card 104, NVMe disk A 105, NVMe disk B 106, NVMe disk C 107, and NVMe disk D 108. Host processor 101 includes host processor operating system 102, software redundant array of independent disks (SWRAID) operating system (OS) driver 103, endpoint A queues 204, endpoint B queues 205, endpoint C queues 206, endpoint D queues 207, and consolidated processing queues 208. Endpoint A queues 204 include endpoint A submission queue 209 and endpoint A completion queue 210. Endpoint B queues 205 include endpoint B submission queue 211 and endpoint B completion queue 212. Endpoint C queues 206 include endpoint C submission queue 213 and endpoint C completion queue 214. Endpoint D queues 207 include endpoint D submission queue 215 and endpoint D completion queue 216. Consolidated processing queues 113 include consolidated processing submission queue 217 and consolidated processing completion queue 218.

NVMe hardware assist card 104 includes NVMe endpoint A port 220, NVMe endpoint B port 221, NVMe endpoint C port 222, NVMe endpoint D port 223, and consolidated processing endpoint 224, which provide respective NVMe endpoints to interface with endpoint A queues 204, endpoint B queues 205, endpoint C queues 206, and endpoint D queues 207 of host processor 101. For example, the endpoint ports can appear the endpoint queues as if the endpoint ports were actual NVMe storage devices. Thus, for example, the endpoint ports can provide apparent NVMe storage devices from the perspective of the endpoint queues of host processor 101.

Endpoint A queues 204 of host processor 101 are connected to NVMe endpoint A port 220 of NVMe hardware assist card 104 via endpoint interconnection A 109. Endpoint B queues 205 of host processor 101 are connected to NVMe endpoint B port 221 of NVMe hardware assist card 104 via endpoint interconnection B 110. Endpoint C queues 206 of host processor 101 are connected to NVMe endpoint C port 222 of NVMe hardware assist card 104 via endpoint interconnection C 111. Endpoint D queues 207 of host processor 101 are connected to NVMe endpoint D port 223 of NVMe hardware assist card 104 via endpoint interconnection D 112. Consolidated processing queues 208 of host processor 101 are connected to consolidated processing endpoint 224 of NVMe hardware assist card 104 via consolidated processing interconnection 113.

NVMe hardware assist card 104 includes EP processing circuit 225 and VR_EP processing circuit 226. EP processing circuit 225 includes a command request processing portion, which submits a received NVMe command to an appropriate one of downstream port A 228, downstream port B 229, downstream port C 230, and downstream port D 231. EP processing circuit 225 includes a command completion processing portion receives the NVMe command response, completes the NVMe command response, and posts the NVMe command response to a respective completion queue for a respective one of NVMe endpoint A port 220, NVMe endpoint B port 221, NVMe endpoint C port 222, or NVMe endpoint D port 223. In accordance with at least one embodiment, the command request processing portion and the command completion processing portion can be combined into a command request/completion processing portion. EP processing circuit 225 includes a doorbell processing portion, which rings a doorbell indicator for the one of NVMe endpoint A port 220, NVMe endpoint B port 221, NVMe endpoint C port 222, or NVMe endpoint D port 223 corresponding to the one of NVMe disk A 105, NVMe disk B 106, NVMe disk C 107, and NVMe disk D 108 providing the NVMe command response to NVMe hardware assist card 104. EP processing circuit 225 includes a RPx discovery and EP enumeration processing portion, which participates in the enumeration process for instantiating NVMe endpoint A port 220, NVMe endpoint B port 221, NVMe endpoint C port 222, and NVMe endpoint D port 223 as NVMe endpoints visible to host processor 101. The RPx discovery and EP enumeration processing portion of EP processing circuit 225 also participates in the enumeration process for instantiating NVMe disk A 105, NVMe disk B 106, NVMe disk C 107, and NVMe disk D 108 as actual NVMe storage devices connected to NVMe hardware assist card 104.

VR_EP processing circuit 226 includes a command request processing portion, which sends a received NVMe command from consolidated processing submission queue 217 to a command parser processing portion of VR_EP processing circuit 226. The command parser processing portion of VR_EP processing circuit 226 parses the submission queue entry, generates individual NVMe commands for each of NVMe disk A 105, NVMe disk B 106, NVMe disk C 107, and NVMe disk D 108, and sends the respective individual NVMe commands to the command request processing portion of VR_EP processing circuit 226. The command request processing portion of VR_EP processing circuit 226 submits each respective NVMe command to the respective downstream port of downstream port A 228, downstream port B 229, downstream port C 230, and downstream port D 231, corresponding, respectively, to NVMe disk A 105, NVMe disk B 106, NVMe disk C 107, and NVMe disk D 108. Each of each of NVMe disk A 105, NVMe disk B 106, NVMe disk C 107, and NVMe disk D 108 performs its respective NVMe drive command processing on the respective NVMe command provided to it by the NVMe hardware assist card 104 and provides a respective NVMe command response to NVMe hardware assist card 104. VR_EP processing circuit 226 comprises a command completion processing portion, which receives the individual NVMe command responses upon completion of the NVMe command processing at each of NVMe disk A 105, NVMe disk B 106, NVMe disk C 107, and NVMe disk D 108. The command completion processing portion of VR_EP processing circuit 226 aggregates into a completion queue entry the NVMe command responses received via from NVMe disk A 105, NVMe disk B 106, NVMe disk C 107, and NVMe disk D 108 via downstream port A 228, downstream port B 229, downstream port C 230, and downstream port D 231, respectively. The command processing portion of VR_EP processing circuit 226 writes the completion queue entry to consolidated processing completion queue 218. VR_EP processing circuit 226 comprises a VR_EP MSI-x processing portion, which generates a consolidated interrupt and triggers a doorbell processor portion of VR_EP processing circuit 226 to ring a respective doorbell (provide a doorbell register indication) for consolidated processing endpoint 224.

NVMe hardware assist card 104 includes downstream port A 228, downstream port B 229, downstream port C 230, and downstream port D 231. Downstream port A 228 of NVMe hardware assist card 104 is connected to NVMe disk A 105 via downstream interconnection 114. Downstream port B 229 of NVMe hardware assist card 104 is connected to NVMe disk B 106 via downstream interconnection 115. Downstream port C 230 of NVMe hardware assist card 104 is connected to NVMe disk C 107 via downstream interconnection 116. Downstream port D 231 of NVMe hardware assist card 104 is connected to NVMe disk D 108 via downstream interconnection 117.

In accordance with at least one embodiment, consolidated processing endpoint 224 provides an aggregator end-point (VR_EP) which is useful for command processing and completion processing for commands destined through consolidated processing submission queue 217 and consolidated processing completion queue 218. Thus, a queue-based NVM hardware assist card 104 can act as a queue-based NVM controller (such as an NVMe controller) for commands submitted through consolidated processing submission queue 217 and consolidated processing completion queue 218.

In addition, queue-based NVM hardware assist card 104 can also support endpoint submission queues 209, 211, 213, and 215 and endpoint completion queues 210, 212, 214, and 216 via multiple endpoints (such as EP1, EP2, EP3, and EP4). Thus, queues 209 through 216 can be used for direct pass-through commands to the individual NVMe disks 105-108 using a one-to-one (1:1) mapping. The one-to-one (1:1) mapping allows one endpoint submission queue (such as 209) and one endpoint completion queue (such as 210) to be used exclusively for a corresponding one NVMe disk (such as 105), which another endpoint submission queue (such as 211) and another endpoint completion queue (such as 212) are used exclusively for a corresponding other NVMe disk (such as 106). The use of disk-specific endpoint submission and completion queues for some queue-based NVM commands and the use of consolidated processing submission queue 217 and consolidated processing completion queue 218 for other queue-based NVM commands provides flexibility in the processing of queue-based NVM commands by supporting both consolidated and individual processing within the same queue-based NVM hardware assist card 104.

FIG. 3 is a tabular diagram illustrating an NVMe command slot reservation payload as may be used within the information handling system according to an embodiment of the present disclosure. Table 300 comprises NVMe drive command index slot column 301 and NVMe drive serial number column 302. In the example shown, the NVMe drive command index slot value comprises one byte, and the NVMe drive serial number value comprises 20 bytes. The NVMe drive command index slot value is a value that identifies a single one of the plurality of actual NVMe storage devices in the NVMe storage array. The NVMe drive serial number value is a unique hardware identifier value that identifies a particular hardware NVMe storage device in which a corresponding NVMe drive command index slot value is instantiated.

Table 300 comprises rows 303, 304, 305, and 306. Included in NVMe drive command index slot column 301 as NVMe drive command index slot values are NVMe drive index 0 value 307, NVMe drive index 1 value 309, NVMe drive index 2 value 311, and NVMe drive index 3 value 313. Included in NVMe drive serial number column 302 as NVMe drive serial number values are RP1_NVMe_A_SERIAL_NUMBER value 308, RP2_NVMe_B_SERIAL_NUMBER value 310, RP3_NVMe_C_SERIAL_NUMBER value 312, and RP4_NVMe_D_SERIAL_NUMBER value 314. Row 303 of table 300 comprises NVMe drive index 0 value 307 paired with RP1_NVMe_A_SERIAL_NUMBER value 308. Row 304 of table 300 comprises NVMe drive index value 1 309 paired with RP2_NVMe_B_SERIAL_NUMBER value 310. Row 305 of table 300 comprises NVMe drive index value 2 311 paired with RP3_NVMe_C_SERIAL_NUMBER value 312. Row 306 of table 300 comprises NVMe drive index value 3 313 paired with RP4_NVMe_D_SERIAL_NUMBER value 314.

FIG. 4 is a tabular diagram illustrating an NVMe submission queue entry as may be used within the information handling system according to an embodiment of the present disclosure. Table 400 comprises NVMe drive command index column 401 and NVMe command column 402. NVMe drive command index values are stored in NVMe drive command index column 401. NVMe commands are stored in NVMe command column 402. The NVMe drive command index value is a value that identifies a single one of the plurality of actual NVMe storage devices in the NVMe storage array. The NVMe command is a respective NVMe command applicable to the respective one of the plurality of actual NVMe storage devices identified by the corresponding NVMe drive command index value.

Table 400 comprises rows 403, 404, 405, and 406. Included in NVMe drive command index column 401 as NVMe drive command index values are NVMe drive index 0 value 407, NVMe drive index 1 value 409, NVMe drive index 2 value 411, and NVMe drive index 3 value 413. Included in NVMe command column 402 as NVMe commands are NVMe command 408, NVMe command 410, NVMe command 412, and NVMe command 414. Row 403 of table 400 comprises NVMe drive index 0 value 407 paired with NVMe command 408. Row 404 of table 400 comprises NVMe drive index value 1 409 paired with NVMe command 410. Row 405 of table 400 comprises NVMe drive index value 2 411 paired with NVMe command 412. Row 406 of table 400 comprises NVMe drive index value 3 413 paired with NVMe command 414.

FIG. 5 is a tabular diagram illustrating an NVMe completion queue entry as may be used within the information handling system according to an embodiment of the present disclosure. Table 500 comprises NVMe drive command index column 501 and NVMe response column 502. NVMe drive command index values are stored in NVMe drive command index column 501. NVMe responses are stored in NVMe command column 502. The NVMe drive command index value is a value that identifies a single one of the plurality of actual NVMe storage devices in the NVMe storage array. The NVMe response is a respective NVMe response applicable to the respective one of the plurality of actual NVMe storage devices identified by the corresponding NVMe drive command index value.

Table 500 comprises rows 503, 504, 505, and 506. Included in NVMe drive command index column 501 as NVMe drive command index values are NVMe drive index 0 value 507, NVMe drive index 1 value 509, NVMe drive index 2 value 511, and NVMe drive index 3 value 513. Included in NVMe command column 502 as NVMe commands are NVMe command 508, NVMe command 510, NVMe command 512, and NVMe command 514. Row 503 of table 500 comprises NVMe drive index 0 value 507 paired with NVMe command 508. Row 504 of table 500 comprises NVMe drive index value 1 509 paired with NVMe command 510. Row 505 of table 500 comprises NVMe drive index value 2 511 paired with NVMe command 512. Row 506 of table 500 comprises NVMe drive index value 3 513 paired with NVMe command 514.

Figure 6:
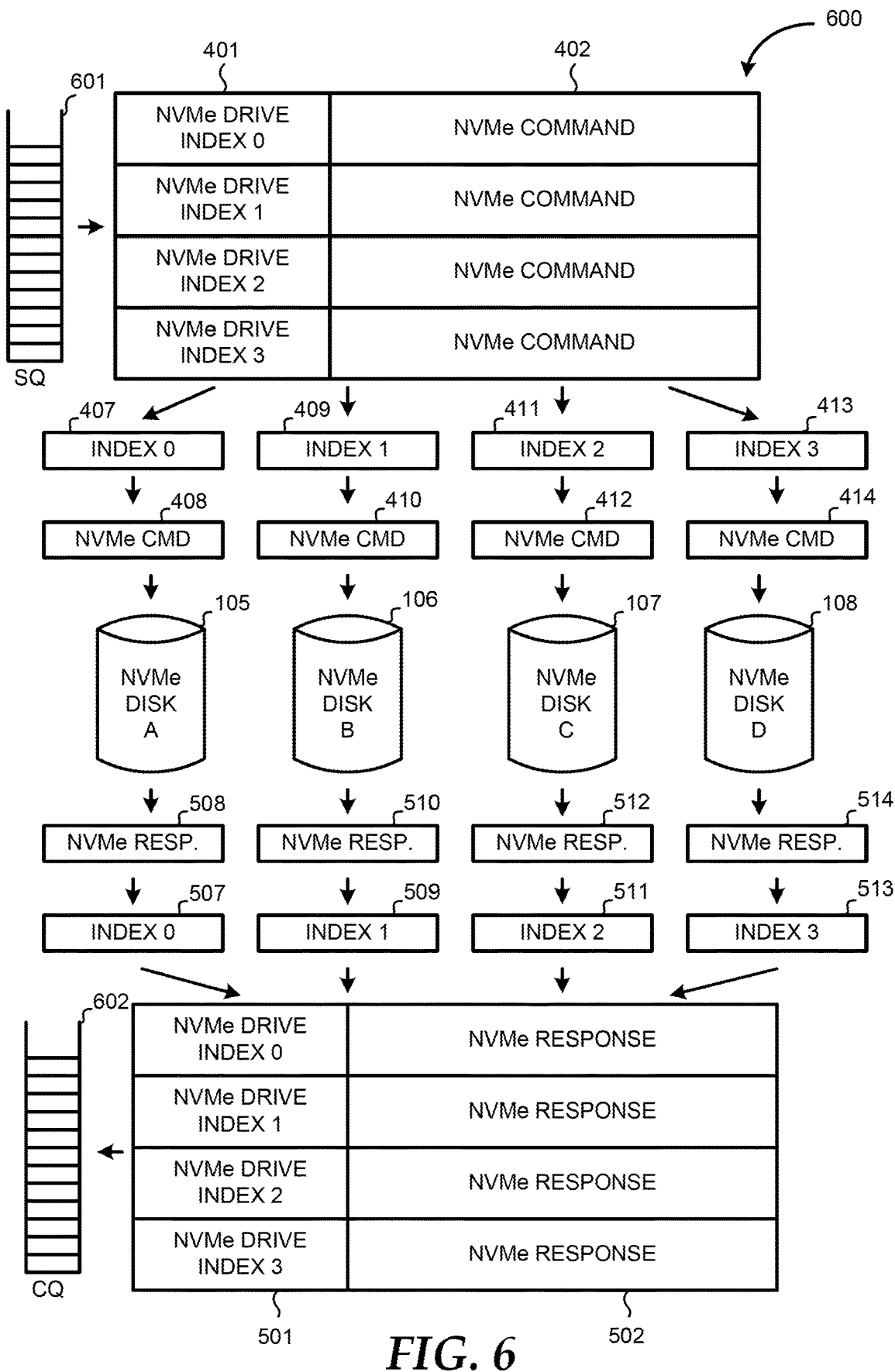
FIG. 6 is a flow diagram illustrating NVMe input-output (IO) command processing in an NVMe hardware assist card of the information handling system according to an embodiment of the present disclosure.

FIG. 6 is a flow diagram illustrating NVMe input-output (IO) command processing in an NVMe hardware assist card of the information handling system according to an embodiment of the present disclosure. Flow diagram 600 comprises submission queue (SQ) 601 providing information, which NVMe hardware assist card 104 can process to send NVMe commands to the respective NVMe disks A, B, C, and D 105, 106, 107, and 108. The information is depicted in the form of table 400 of FIG. 4 having NVMe drive command index column 401 and NVMe command column 402.

NVMe hardware assist card 104 provides NVMe drive index 0 value 407 and NVMe command 408 to NVMe disk A 105. NVMe hardware assist card 104 provides NVMe drive index 1 value 409 and NVMe command 410 to NVMe disk B 106. NVMe hardware assist card 104 provides NVMe drive index 2 value 411 and NVMe command 412 to NVMe disk C 107. NVMe hardware assist card 104 provides NVMe drive index 3 value 413 and NVMe command 414 to NVMe disk D 108.

NVMe disk A 105 provides NVMe drive index 0 value 507 and NVMe response 508 to NVMe hardware assist card 104. NVMe disk B 106 provides NVMe drive index 1 value 509 and NVMe response 510 to NVMe hardware assist card 104. NVMe disk C 107 provides NVMe drive index 2 value 511 and NVMe response 512 to NVMe hardware assist card 104. NVMe disk D 108 provides NVMe drive index 3 value 513 and NVMe response 514 to NVMe hardware assist card 104.

The information received from NVMe disks A, B, C, and D 105, 106, 107, and 108 is depicted in the form of table 500 of FIG. 5, having NVMe drive command index column 501 and NVMe response column 502. NVMe hardware assist card 104 provides such information to completion queue (CQ) 602.

Figure 7:
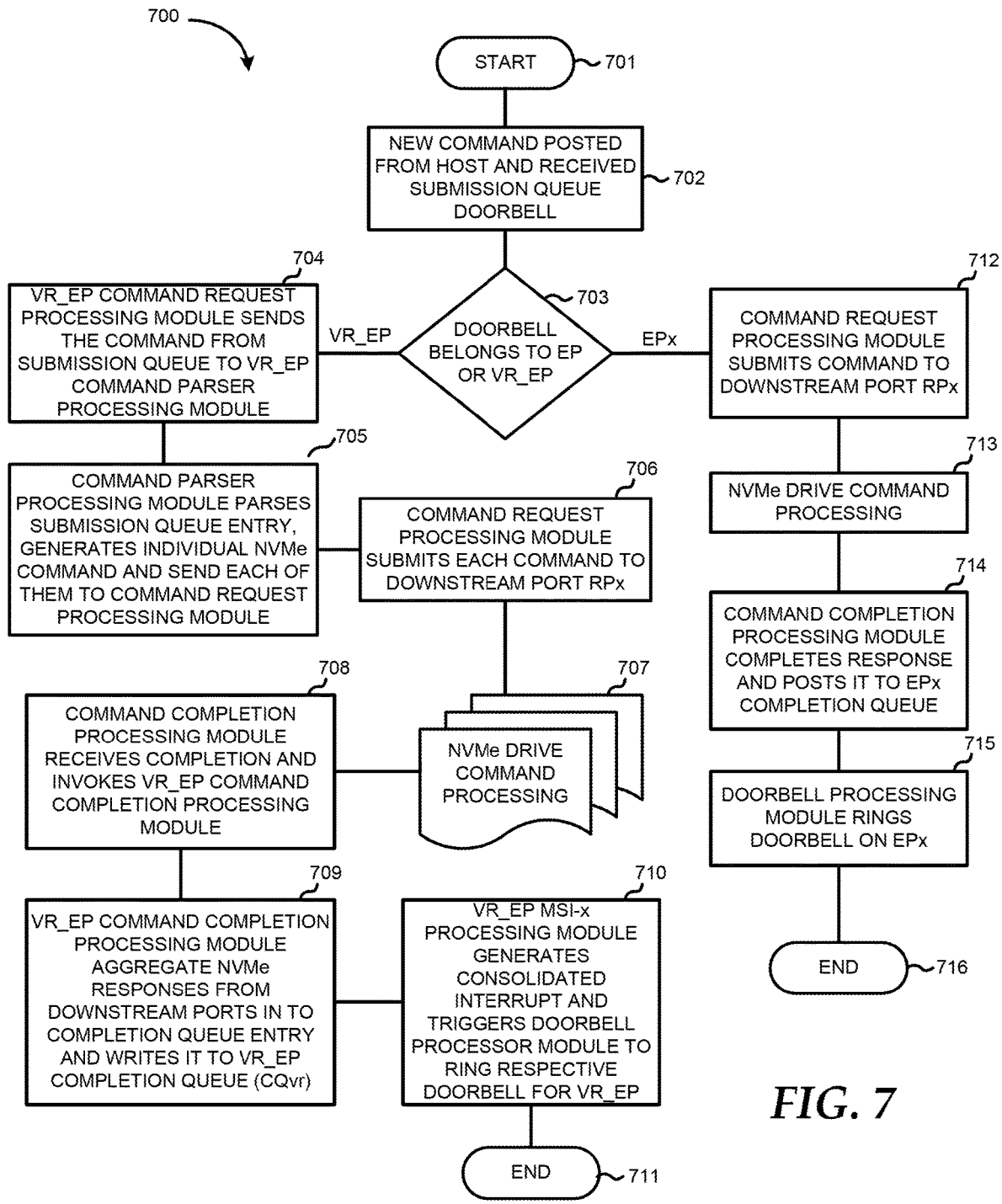
FIG. 7 is a flow diagram illustrating a method that may be performed in the information handling system according to an embodiment of the present disclosure.

FIG. 7 is a flow diagram illustrating a method that may be performed in the information handling system according to an embodiment of the present disclosure. Method 700 begins at start block 701 and continues to block 702. In block 702, a new command is posted from host processor 101, and a submission queue doorbell indication is received by NVMe hardware assist card 104. From block 702, method 700 continues to decision block 703. At decision block 703, NVMe hardware assist card 104 makes a decision whether the doorbell indication belongs to one of NVMe endpoint A port 220, NVMe endpoint B port 221, NVMe endpoint C port 222, or NVMe endpoint D port 223, or else to consolidated processing endpoint 224. If the doorbell indication belongs to one of NVMe endpoint A port 220, NVMe endpoint B port 221, NVMe endpoint C port 222, or NVMe endpoint D port 223, method 700 continues to block 712.

At block 712, a command request processing portion of EP processing circuit 225 submits the received NVMe command to the appropriate one of downstream port A 228, downstream port B 229, downstream port C 230, and downstream port D 231. From block 712, method 700 continues to block 713. At block 713, NVMe drive command processing is performed at the corresponding NVMe drive of NVMe disk A 105, NVMe disk B 106, NVMe disk C 107, and NVMe disk D 108. After the NVMe drive completes the NVMe drive command processing, the NVMe drive provides an NVMe command response to NVMe hardware assist card 104. From block 713, method continues to block 714. At block 714, a command request processing portion of EP processing circuit 225 receives the NVMe command response, completes the NVMe command response, and posts the NVMe command response to a respective completion queue for a respective one of NVMe endpoint A port 220, NVMe endpoint B port 221, NVMe endpoint C port 222, or NVMe endpoint D port 223. As examples, the command request processing portion of EP processing circuit 225 can post the NVMe command response to endpoint A completion queue 210, endpoint B completion queue 212, endpoint C completion queue 214, or endpoint D completion queue 216. From block 714, method 700 continues to block 715. At block 715, a doorbell processing portion of EP processing circuit 225 rings a doorbell indicator for the one of NVMe endpoint A port 220, NVMe endpoint B port 221, NVMe endpoint C port 222, or NVMe endpoint D port 223 corresponding to the one of NVMe disk A 105, NVMe disk B 106, NVMe disk C 107, and NVMe disk D 108 providing the NVMe command response to NVMe hardware assist card 104. From block 715, method 700 continues to block 716, where it ends. Method 700 can be performed iteratively, restarting at start block 701.

If, at decision block 703, the decision is made that the doorbell indication belongs to consolidated processing endpoint 224, method 700 continues from decision block 703 to block 704. At block 704, a command request processing portion of VR_EP processing circuit 226 sends the received NVMe command from consolidated processing submission queue 217 to a command parser processing portion of VR_EP processing circuit 226. From block 704, method 700 continues to block 705. At block 705, the command parser processing portion of VR_EP processing circuit 226 parses the submission queue entry, generates individual NVMe commands for each of NVMe disk A 105, NVMe disk B 106, NVMe disk C 107, and NVMe disk D 108, and sends the respective individual NVMe commands to the command request processing portion of VR_EP processing circuit 226. From block 705, method 700 continues at block 706. At block 706, the command request processing portion of VR_EP processing circuit 226 submits each respective NVMe command to the respective downstream port of downstream port A 228, downstream port B 229, downstream port C 230, and downstream port D 231, corresponding, respectively, to NVMe disk A 105, NVMe disk B 106, NVMe disk C 107, and NVMe disk D 108. From block 706, method 700 continues to block 707. At block 707, each of each of NVMe disk A 105, NVMe disk B 106, NVMe disk C 107, and NVMe disk D 108 performs its respective NVMe drive command processing on the respective NVMe command provided to it by the NVMe hardware assist card 104 and provides a respective NVMe command response to NVMe hardware assist card 104. From block 707, method 700 continues to block 708. At block 708, a command completion processing portion of VR_EP processing circuit 226 receives the individual NVMe command responses upon completion of the NVMe command processing at each of NVMe disk A 105, NVMe disk B 106, NVMe disk C 107, and NVMe disk D 108. From block 708, method 700 continues to block 709. At block 709, the command completion processing portion of VR_EP processing circuit 226 aggregates into a completion queue entry the NVMe command responses received via from NVMe disk A 105, NVMe disk B 106, NVMe disk C 107, and NVMe disk D 108 via downstream port A 228, downstream port B 229, downstream port C 230, and downstream port D 231, respectively. The command processing portion of VR_EP processing circuit 226 writes the completion queue entry to consolidated processing completion queue 218. From block 709, method 700 continues to block 710. At block 710, a VR_EP MSI-x processing portion of VR_EP processing circuit 226 generates a consolidated interrupt and triggers a doorbell processor portion of VR_EP processing circuit 226 to ring a respective doorbell (provide a doorbell indication) for consolidated processing endpoint 224. From block 710, method 700 continues to block 711, where it ends. Method 700 can be performed iteratively, restarting at start block 701.

As compared with previous approaches to interfacing a host processor to a storage array, an information handling system in accordance with an embodiment described herein can improve SWRAID scalability and host processor (such as CPU) efficiency.

An SWRAID NVMe hardware assist card can provide a consolidated processing endpoint in addition to individual NVMe endpoints corresponding to individual NVMe storage devices. The host processor can use an SWRAID driver to access the consolidated processing endpoint (such as a consolidated processing PCIe endpoint (VR_EP)) to submit commands and receive command completions when multiple NVMe commands are being processed simultaneously. The NVMe hardware assist card comprises an endpoint processing circuit and a consolidated processing circuit. The consolidated processing circuit can provide NVMe command processing, intelligent NVMe response aggregation, and other features that can relief the host processor of the need to interact individually with NVM storage devices of an NVM storage device array. The NVMe hardware assist card will have multiple modules as follow: 1. RPx discovery & EP enumeration processing module, 2. command request/completion processing module, 3. doorbell processing module, 4. VR_EP command parser processing module, 5. VR_EP Command request processing module, 6. VR_EP command completion processing module, and 7. VR_EP MSI-X processing module.

The RPx discovery & EP enumeration processing module discovers the NVMe drives connected to the downstream ports of the NVMe hardware assist card and creation of the submission/completion queues for the all connected NVMe drives. It also exposes upstream PCIe NVMe endpoints (EP1, EP2, EP3, EP4) representing the downstream NVMe drives and 1 consolidated processing PCIe endpoint (VR_EP). This module will send administration commands for discovering all downstream NVMe drives.

The command request/completion processing module sends NVMe commands (administration and IO) to the NVMe drives connected to downstream ports and also processes the NVMe command completion responses. This module reads the NVMe command from the host submission queue memory for upstream PCIe NVMe endpoints (EP1, EP2, EP3, EP4) and writes it into the submission queue of the NVMe drive (RP1, RP2, RP3, RP4). Similarly, it is the responsibility of this module to read the completion queue entry of the NVMe drive (RP1, RP2, RP3, RP4) and write it into the completion queue of its corresponding upstream port (EP1, EP2, EP3, EP4).

The doorbell processing module monitors when a doorbell register write has happened for a particular queue of a specific upstream PCIe endpoint. Once this module detects that a doorbell write has happened, it triggers the command request processing module or VR_EP command request processing module to read the submission queue entry of the PCIe upstream endpoint for which the doorbell write had taken place. This module also writes the doorbell register of the downstream port connected to the NVMe device once the submission queue entry data has been updated in the submission queue of the downstream port NVMe drive. This module also writes the completion doorbell register of the upstream PCIe endpoints (both EPx and VR_EP) once the completion queue entries have been updated in its completion queues.

The VR_EP command request processing module reads the NVME_SUBMISSION_QUEUE_ENTRY for VR_EP from the host submission queue (SQvr) memory for upstream consolidated processing PCIe endpoint (VR_EP) and send it to VR_EP command parser processing module. This module is invoked by the doorbell processing module once a doorbell register write has happened for a particular queue of the consolidated processing PCIe endpoint (VR_EP).

The VR_EP command parser processing module parses the NVME_SUBMISSION_QUEUE_ENTRY for VR_EP into individual NVMe commands which gets passed on to the command request/completion processing module to be finally issued to the downstream NVMe drives.

The VR_EP command completion processing module gets triggered by command request/completion processing module based on whether the initial command came from EPx or VR_EP. If the command came from VR_EP then multiple NVMe responses from the downstream ports of the NVMe hardware assist card are aggregated into NVME_COMPLETION_QUEUE_ENTRY for VR_EP and then written into the completion queue (CQvr) memory for upstream consolidated processing PCIe endpoint (VR_EP).

The VR_EP MSI-X processing module has as its main function to consolidate multiple MSI-X Interrupt generated from the NVMe drives connected to downstream ports of NVMe hardware assist card and generate a single interrupt to the SWRAID OS driver when the aggregated NVME_COMPLETION_QUEUE_ENTRY for VR_EP has been written into the completion queue (CQvr) memory for upstream consolidated processing PCIe endpoint (VR_EP). This consolidation of multiple MSI-X Interrupts is done for NVMe command completions which are part of the same NVME_SUBMISSION_QUEUE_ENTRY for VR_EP.

The functionality of the PCIe NVMe hardware assist card can include the following: 1. enumerate and expose virtual NVMe endpoints representing the physical NVMe devices connected to the downstream ports, 2. expose a consolidated processing PCIe endpoint, 3. processing aggregated NVMe commands received using consolidated processing PCIe endpoint, 4. aggregate multiple NVMe command completions from different NVMe endpoints and generate consolidated doorbell/interrupt call using consolidated processing PCIe endpoint (VR_EP), and 5. process NVMe commands from NVMe PCIe endpoints (EPx).

The NVM hardware assist card can perform mapping drive index field in submission/completion queue entry with NVMe drives. Once the consolidated processing PCIe endpoint VR_EP is exposed to the SWRAID driver, to submit multiple NVMe commands as part of NVME_SUBMISSION_QUEUE_ENTRY for VR_EP it is necessary for the host processor OS driver to map the NVMe drive Index field in submission/completion queue entry for VR_EP with the actual NVMe drives. This handshake is achieved between SWRAID driver and NVMe hardware assist card using the NVME_CMD_SLOT_RESERVATION for VR_EP. The payload of the command contains the mapping of the NVMe drive serial number with an Index which would help map the NVMe drives uniquely in NVME_SUBMISSION_QUEUE_ENTRY and NVME_COMPLETION_QUEUE_ENTRY for VR_EP.

Command processing can be performed as described below with an SWRAID driver and an NVMe hardware assist card. Firstly, the SWRAID driver creates consolidated processing submission and completion queues capable of holding NVMe command submission and completion data for multiple NVMe drives together. Secondly, the consolidated processing submission queues (SQvr), consolidated processing completion queues (CQvr) will be created by the SWRAID Host driver and commands will be shipped from host to device and device to Host using its corresponding doorbell registers. Thirdly, the SWRAID driver will generate multiple NVMe commands which can be shipped simultaneously to different NVMe drives for serving the IO request it has received from OS for the RAID virtual disk. As one example, a 256K READ request to a RAID0 VD created from four NVMe drives will result in four NVMe READ commands of 64K size each. These four commands instead of being shipped separately and resulting in four interrupts can now be issued as a single command and completed with a single interrupt in the context of host processor. As another example, a 4K WRITE request to a RAID5 VD created from four NVMe drives will result in two NVMe READ and two NVMe WRITE commands of 4K size each. These four commands, instead of being transmitted separately and resulting in four interrupts, can now be issued as two READ requests together and then parity calculation followed by two WRITE requests issued together. Thus resulting in a two interrupts being generated instead of four in the context of the host processor. Fourthly, these multiple NVMe commands will be packaged together into a single NVME_SUBMISSION_QUEUE_ENTRY for consolidated processing PCIe endpoint VR_EP. Fifthly, the NVMe hardware assist card reads the aggregated NVME_SUBMISSION_QUEUE_ENTRY for consolidated processing PCIe endpoint VR_EP and parses it to extract the individual NVMe commands for different NVMe drives. Sixthly, the NVMe hardware assist card then issues multiple NVMe commands to the NVMe drives connected to its downstream ports. Seventhly, once commands are completed the NVMe hardware assist card aggregates the NVMe command responses and forms the aggregated NVME_COMPLETION_QUEUE_ENTRY for VR_EP which gets written to the Host VR_EP completion queue (CQvr) memory. Eighthly, the NVMe hardware assist card also aggregates/coalesces MSI-X interrupts from different NVMe drives and generates a single MSI-X interrupt to the host processor OS once the doorbell register has been written for the completion queue.

As compared to previous technology, the proposed solution improves SWRAID scalability and host processor (such as CPU) efficiency for different NVMe RAID VD configurations running varied IO patterns. Host processor efficiency can be provided on par with hardware RAID (HWRAID) solutions by using an NVM hardware assist card without the need to implement a RAID stack on the NVM hardware assist card, thereby providing high levels of host processor efficiency in conjunction with the flexibility of SWRAID. By intelligently hiding unnecessary interrupts to a host processor operating system (OS) based on the NVMe commands submitted as a group, Host processor bandwidth can be saved without compromising on performance. Multiple NVMe commands can be submitted to different NVMe drives using a single Submission Queue Entry and a single doorbell register write. Multiple NVMe commands from different NVMe drives can be completed using a single Completion Queue Entry and a single doorbell register write. Multiple NVMe command completions from different NVMe endpoints can be aggregated, and a consolidated doorbell/interrupt call can be generated using consolidated processing PCIe endpoint.

Referring back to FIG. 1, host processor 101 may be in an information handling system comprising, in accordance with various embodiments, other elements, such as a memory, a northbridge/chipset, a PCI bus, a universal serial bus (USB) controller, a USB, a keyboard device controller, a mouse device controller, a configuration an ATA bus controller, an ATA bus, a hard drive device controller, a compact disk read only memory (CD ROM) device controller, a display controller, a network interface controller (NIC), a wireless local area network (WLAN) controller, a serial peripheral interface (SPI) bus, a NVRAM for storing BIOS, and a baseboard management controller (BMC). BMC can be referred to as a service processor or embedded controller (EC). Capabilities and functions provided by BMC can vary considerably based on the type of information handling system. For example, the term baseboard management system is often used to describe an embedded processor included at a server, while an embedded controller is more likely to be found in a consumer-level device. As disclosed herein, BMC represents a processing device different from a central processing unit (CPU), which provides various management functions for information handling system. For example, an embedded controller may be responsible for power management, cooling management, and the like. An embedded controller included at a data storage system can be referred to as a storage enclosure processor.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a CPU, a programmable logic array (PLA), an embedded device such as a System-on-a-Chip (SoC), or other control logic hardware. An information handling system can also include one or more computer-readable medium for storing machine-executable code, such as software or data.

An information handling system can include additional processors that are configured to provide localized or specific control functions, such as a battery management controller. A bus can include one or more busses, including a SPI bus, an I2C bus, a system management bus (SMBUS), a power management bus (PMBUS), and the like. A BMC can be configured to provide out-of-band access to devices at an information handling system. As used herein, out-of-band access herein refers to operations performed prior to execution of BIOS by processor to initialize operation of an information handling system.

A BIOS can be referred to as a firmware image, and the term BIOS is herein used interchangeably with the term firmware image, or simply firmware. A BIOS includes instructions executable by a CPU to initialize and test the hardware components of an information handling system, and to load a boot loader or an operating system (OS) from a mass storage device. A BIOS additionally provides an abstraction layer for the hardware, such as a consistent way for application programs and operating systems to interact with the keyboard, display, and other input/output devices. When power is first applied to an information handling system, the system begins a sequence of initialization procedures. During the initialization sequence, also referred to as a boot sequence, components of an information handling system are configured and enabled for operation, and device drivers can be installed. Device drivers provide an interface through which other components of the information handling system can communicate with a corresponding device.

An information handling system can include additional components and additional busses, not shown for clarity. For example, an information handling system can include multiple processor cores, audio devices, and the like. While a particular arrangement of bus technologies and interconnections is illustrated for the purpose of example, one of skill will appreciate that the techniques disclosed herein are applicable to other system architectures. An information handling system can include multiple CPUs and redundant bus controllers. One or more components can be integrated together. For example, portions of a northbridge/chipset can be integrated within a CPU. Additional components of information handling system 100 can include one or more storage devices that can store machine-executable code, one or more communications ports for communicating with external devices, and various input and output (I/O) devices, such as a keyboard, a mouse, and a video display. An example of an information handling system can include a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

An information handling system can include a set of instructions that can be executed to cause the information handling system to perform any one or more of the methods or computer based functions disclosed herein. An information handling system may operate as a standalone device or may be connected to other computer systems or peripheral devices, such as by a network.

In a networked deployment, an information handling system may operate in the capacity of a server or as a client user computer in a server-client user network environment, or as a peer computer system in a peer-to-peer (or distributed) network environment. An information handling system can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, an information handling system can be implemented using electronic devices that provide voice, video or data communication. Further, while a single information handling system is illustrated, the term "system" shall also be taken to include any collection of systems or sub-systems that individually or jointly execute a set, or multiple sets, of instructions to perform one or more computer functions.

An information handling system can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory or another memory included at system, and/or within a processor during execution by the information handling system. The system memory and the processor also may include computer-readable media.

An information handling system includes a power source to provide one or more electrical outputs to power the above-described elements of an information handling system. Accordingly, a power source is coupled to the above-described elements of an information handling system, although the electrical connections are not shown so as to avoid obscuring FIG. 1.

In accordance with at least one embodiment, a queue-based non-volatile memory (NVM) hardware assist card includes a plurality of downstream ports configured to be connected to a corresponding plurality of actual queue-based NVM storage devices, a plurality of upstream ports configured to appear as a plurality of apparent queue-based NVM storage devices, and a distinct upstream port of a different type than the plurality of upstream ports, the distinct upstream port for interacting with a host processor to receive a consolidated processing NVM command from and to return a consolidated processing NVM command completion indication to the host processor, the queue-based NVM hardware assist card configured to aggregate multiple of the NVM command completion messages received via respective ones of the plurality of downstream ports from respective ones of the plurality of actual queue-based NVM storage devices and to generate the consolidated processing NVM command completion indication to provide to the host processor.

In accordance with at least one embodiment, the queue-based NVM hardware assist card is configured to receive individual-queue-based-NVM-storage-device-specific NVM commands and send individual-queue-based-NVM-storage-device-specific NVM command completion messages via the plurality of upstream ports. In accordance with at least one embodiment, the queue-based NVM hardware assist card is configured to submit individual-queue-based-NVM-storage-device-specific NVM commands to respective ones of the plurality of actual queue-based NVM storage devices via respective ones of the plurality of downstream ports based on receiving the consolidated processing NVM command from the host processor. In accordance with at least one embodiment, the queue-based NVM hardware assist card is configured receive a consolidated processing NVM command readiness indication to receive the consolidated processing NVM command from the host processor using a first single doorbell register operation. In accordance with at least one embodiment, the queue-based NVM hardware assist card is configured to provide a consolidated processing NVM command completion indication readiness indication to return the consolidated processing NVM command completion indication to the host processor using a second single doorbell register operation. In accordance with at least one embodiment, the queue-based NVM hardware assist card is configured to receive the consolidated processing NVM command applicable to the plurality of actual queue-based NVM storage devices via a single submission queue and to provide the consolidated processing NVM command completion indication applicable to the plurality of actual queue-based NVM storage devices via a single completion queue. In accordance with at least one embodiment, the queue-based NVM hardware assist card is configured to generate and send to the plurality of actual queue-based NVM storage devices a respective plurality of individual-queue-based-NVM-storage-device-specific NVM commands based on the consolidated processing NVM command received from the host processor.

In accordance with at least one embodiment, a method includes obtaining, in a queue-based non-volatile memory (NVM) hardware assist card, a first doorbell indication of NVM command information received in a submission queue; determining, in the queue-based NVM hardware assist card, whether the NVM command information pertains to an NVM endpoint or to a consolidated processing endpoint; when the NVM command information is determined to pertain to an NVM endpoint, submitting the NVM command information to a queue-based NVM storage device via a downstream port corresponding to the NVM endpoint and the queue-based NVM storage device, receiving an NVM command response via the downstream port, posting the NVM command response to a completion queue, and signaling a second doorbell indication via the NVM endpoint; and, when the NVM command information is determined to pertain to a consolidated processing endpoint, sending the NVM command information to a consolidated processing command parser processing portion of a consolidated processing circuit, parsing the NVM command information, generating individual NVM commands, submitting the individual NVM commands to respective queue-based NVM storage devices to which they pertain via respective downstream ports, receiving NVM command responses from the respective queue-based NVM storage devices via respective downstream ports, aggregating the NVM command responses to form a consolidated NVM command response, writing the consolidated NVM command response to a consolidated processing completion queue, generating a consolidated interrupt, and signaling a third doorbell indication via the consolidated processing endpoint.

In accordance with at least one embodiment, the parsing the NVM command information is performed in a consolidated processing command parser processing portion of a consolidated processing circuit of the queue-based NVM hardware assist card. In accordance with at least one embodiment, the submitting the individual NVM commands to the respective queue-based NVM storage devices is performed in a command request processing portion of the consolidated processing circuit of the queue-based NVM hardware assist card. In accordance with at least one embodiment, the receiving NVM command responses from the respective queue-based NVM storage devices via the respective downstream ports is performed in a command completion processing portion of the consolidated processing circuit of the queue-based NVM hardware assist card. In accordance with at least one embodiment, the aggregating the NVM command responses to form the consolidated NVM command response is performed in a command completion processing portion of the consolidated processing circuit of the queue-based NVM hardware assist card. In accordance with at least one embodiment, wherein the writing the consolidated NVM command response to the consolidated processing completion queue is performed in a command completion processing portion of the consolidated processing circuit of the queue-based NVM hardware assist card. In accordance with at least one embodiment, the generating the consolidated interrupt and the signaling a third doorbell indication via the consolidated processing endpoint are performed in a extended message-signaled interrupt (MSI-X) processing portion of the consolidated processing circuit of the queue-based NVM hardware assist card.

In accordance with at least one embodiment, an information handling system includes a host processor, a queue-based non-volatile memory (NVM) hardware assist card coupled to the host processor, and a plurality of actual queue-based NVM storage devices coupled to the queue-based NVM hardware assist card, wherein the queue-based NVM hardware assist card includes a plurality of downstream ports configured to be connected to corresponding ones of the plurality of actual queue-based NVM storage devices, a plurality of upstream ports configured to appear as a plurality of apparent queue-based NVM storage devices, and a distinct upstream port of a different type than the plurality of upstream ports, the distinct upstream port for interacting with a host processor driver of the host processor to receive a consolidated processing NVM command from the host processor and to return a consolidated processing NVM command completion indication to the host processor, the queue-based NVM hardware assist card configured to aggregate a plurality of NVM command completion messages received from respective ones of the plurality of actual queue-based NVM storage devices via respective ones of the plurality of downstream ports and to generate the consolidated processing NVM command completion indication.

In accordance with at least one embodiment, the queue-based NVM hardware assist card is configured to receive individual-queue-based-NVM-storage-device-specific NVM commands and send individual-queue-based-NVM-storage-device-specific NVM command completion messages via the plurality of upstream ports. In accordance with at least one embodiment, the queue-based NVM hardware assist card is configured to submit individual-queue-based-NVM-storage-device-specific NVM commands to respective ones of the plurality of actual queue-based NVM storage devices via respective ones of the plurality of downstream ports based on receiving the consolidated processing NVM command from the host processor. In accordance with at least one embodiment, the queue-based NVM hardware assist card is configured receive a consolidated processing NVM command readiness indication to receive the consolidated processing NVM command from the host processor using a first single doorbell register operation. In accordance with at least one embodiment, the queue-based NVM hardware assist card is configured to provide a consolidated processing NVM command completion indication readiness indication to return the consolidated processing NVM command completion indication to the host processor using a second single doorbell register operation. In accordance with at least one embodiment, the queue-based NVM hardware assist card is configured to receive the consolidated processing NVM command applicable to the plurality of actual queue-based NVM storage devices via a single submission queue and to provide the consolidated processing NVM command completion indication applicable to the plurality of actual queue-based NVM storage devices via a single completion queue.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A queue-based non-volatile memory (NVM) hardware assist card comprising:
    a plurality of downstream ports configured to be connected to a corresponding plurality of actual queue-based NVM storage devices;
    a plurality of upstream ports configured to appear as a plurality of apparent queue-based NVM storage devices;
    a distinct upstream port of a different type than the upstream ports, the distinct upstream port for interacting with a host processor to receive a consolidated processing NVM command from and to return a consolidated processing NVM command completion indication to the host processor;
    an endpoint processing circuit to receive an NVM command from one of the plurality of upstream ports and to submit the received NVM command to an appropriate one of a plurality of NVM storage devices connected to the NVM hardware assist card, wherein the appropriate one of the NVM storage devices is directly associated with the one of the plurality of upstream ports; and
    a consolidated processing circuit to receive the consolidated processing NVM command from the distinct upstream port and to return a consolidated processing NVM command completion indication to the host processor via the distinct upstream port, the NVM hardware assist card configured to aggregate multiple of the NVM command completion messages received via respective ones of the downstream ports from respective ones of the actual NVM storage devices and to generate the consolidated processing NVM command completion indication to provide to the host processor, the host processor distinct from the queue-based NVM hardware assist card.

2. The queue-based NVM hardware assist card of claim 1, wherein the queue-based NVM hardware assist card is configured to receive individual-queue-based-NVM-storage-device-specific NVM commands and send individual-queue-based-NVM-storage-device-specific NVM command completion messages via the upstream ports.

3. The queue-based NVM hardware assist card of claim 1, wherein the queue-based NVM hardware assist card is configured to submit individual-queue-based-NVM-storage-device-specific NVM commands to respective ones of the actual queue-based NVM storage devices via respective ones of the downstream ports based on receiving the consolidated processing NVM command from the host processor.

4. The queue-based NVM hardware assist card of claim 3, wherein the queue-based NVM hardware assist card is configured receive a consolidated processing NVM command readiness indication to receive the consolidated processing NVM command from the host processor using a first single doorbell register operation.

5. The queue-based NVM hardware assist card of claim 4, wherein the queue-based NVM hardware assist card is configured to provide a consolidated processing NVM command completion indication readiness indication to return the consolidated processing NVM command completion indication to the host processor using a second single doorbell register operation.

6. The queue-based NVM hardware assist card of claim 1, wherein the queue-based NVM hardware assist card is configured to receive the consolidated processing NVM command applicable to the actual queue-based NVM storage devices via a single submission queue and to provide the consolidated processing NVM command completion indication applicable to the actual queue-based NVM storage devices via a single completion queue.

7. The queue-based NVM hardware assist card of claim 1, wherein the queue-based NVM hardware assist card is configured to generate and send to the actual queue-based NVM storage devices a respective plurality of individual-queue-based-NVM-storage-device-specific NVM commands based on the consolidated processing NVM command received from the host processor.

8. A method comprising:
    obtaining, in a queue-based non-volatile memory (NVM) hardware assist card, a first doorbell indication of NVM command information received in a submission queue;
    determining, in the queue-based NVM hardware assist card, whether the NVM command information pertains to an NVM endpoint or to a consolidated processing endpoint;
    when the NVM command information is determined to pertain to an NVM endpoint, submitting, by an endpoint processing circuit, the NVM command information to a queue-based NVM storage device via a downstream port corresponding to the NVM endpoint and the queue-based NVM storage device, receiving an NVM command response via the downstream port, posting the NVM command response to a completion queue, and signaling a second doorbell indication via the NVM endpoint, wherein a plurality of upstream ports of the queue-based NVM hardware assist card are configured to appear as a plurality of apparent queue-based NVM storage devices to a host processor; and
    when the NVM command information is determined to pertain to a consolidated processing endpoint, sending the NVM command information to a consolidated processing command parser processing portion of a consolidated processing circuit, parsing the NVM command information, generating individual NVM commands, submitting the individual NVM commands to respective queue-based NVM storage devices to which they pertain via respective downstream ports, receiving NVM command responses from the respective queue-based NVM storage devices via respective downstream ports, aggregating the NVM command responses to form a consolidated NVM command response, writing the consolidated NVM command response to a consolidated processing completion queue, generating a consolidated interrupt, and signaling a third doorbell indication via the consolidated processing endpoint, wherein a distinct upstream port of a different type than the upstream ports provides for interacting with the host processor.

9. The method of claim 8, wherein the parsing the NVM command information is performed in a consolidated processing command parser processing portion of a consolidated processing circuit of the queue-based NVM hardware assist card.

10. The method of claim 8, wherein the submitting the individual NVM commands to the respective queue-based NVM storage devices is performed in a command request processing portion of the consolidated processing circuit of the queue-based NVM hardware assist card.

11. The method of claim 8, wherein the receiving NVM command responses from the respective queue-based NVM storage devices via the respective downstream ports is performed in a command completion processing portion of the consolidated processing circuit of the queue-based NVM hardware assist card.

12. The method of claim 8, wherein the aggregating the NVM command responses to form the consolidated NVM command response is performed in a command completion processing portion of the consolidated processing circuit of the queue-based NVM hardware assist card.

13. The method of claim 8, wherein the writing the consolidated NVM command response to the consolidated processing completion queue is performed in a command completion processing portion of the consolidated processing circuit of the queue-based NVM hardware assist card.

14. The method of claim 8, wherein the generating the consolidated interrupt and the signaling a third doorbell indication via the consolidated processing endpoint are performed in a extended message-signaled interrupt (MSI-X) processing portion of the consolidated processing circuit of the NVM hardware assist card.

15. An information handling system comprising:
a host processor;
a queue-based non-volatile memory (NVM) hardware assist card coupled to the host processor; and
a plurality of actual queue-based NVM storage devices coupled to the queue-based NVM hardware assist card, wherein the queue-based NVM hardware assist card includes:
  a plurality of downstream ports configured to be connected to corresponding ones of the actual queue-based NVM storage devices;
  a plurality of upstream ports configured to appear as a plurality of apparent queue-based NVM storage devices;
  a distinct upstream port of a different type than the upstream ports, the distinct upstream port for interacting with a host processor driver of the host processor to receive a consolidated processing NVM command from the host processor and to return a consolidated processing NVM command completion indication to the host processor;
  an endpoint processing circuit to receive an NVM command from one of the plurality of upstream ports and to submit the received NVM command to an appropriate one of a plurality of NVM storage devices connected to the NVM hardware assist card, wherein the appropriate one of the NVM storage devices is directly associated with the one of the plurality of upstream ports; and
  a consolidated processing circuit to receive the consolidated processing NVM command from the distinct upstream port and to return a consolidated processing NVM command completion indication to the host processor via the distinct upstream port, the queue-based NVM hardware assist card configured to aggregate a plurality of NVM command completion messages received from respective ones of the actual queue-based NVM storage devices via respective ones of the downstream ports and to generate the consolidated processing NVM command completion indication.

16. The information handling system of claim 15, wherein the queue-based NVM hardware assist card is configured to receive individual-queue-based-NVM-storage-device-specific NVM commands and send individual-queue-based-NVM-storage-device-specific NVM command completion messages via the upstream ports.

17. The information handling system of claim 15, wherein the queue-based NVM hardware assist card is configured to submit individual-queue-based-NVM-storage-device-specific NVM commands to respective ones of the actual queue-based NVM storage devices via respective ones of the downstream ports based on receiving the consolidated processing NVM command from the host processor.

18. The information handling system of claim 17, wherein the queue-based NVM hardware assist card is configured receive a consolidated processing NVM command readiness indication to receive the consolidated processing NVM command from the host processor using a first single doorbell register operation.

19. The information handling system of claim 18, wherein the queue-based NVM hardware assist card is configured to provide a consolidated processing NVM command completion indication readiness indication to return the consolidated processing NVM command completion indication to the host processor using a second single doorbell register operation.

20. The information handling system of claim 15, wherein the queue-based NVM hardware assist card is configured to receive the consolidated processing NVM command applicable to the actual queue-based NVM storage devices via a single submission queue and to provide the consolidated processing NVM command completion indication applicable to the actual queue-based NVM storage devices via a single completion queue.

* * * * *